(12) United States Patent
Bjornson et al.

(10) Patent No.: US 7,651,042 B2
(45) Date of Patent: Jan. 26, 2010

(54) METHOD AND APPARATUS FOR CREATING A SLURRY

(75) Inventors: Bradford E. Bjornson, Lethbridge (CA); Garth Robert Booker, Fort McMurray (CA)

(73) Assignee: Suncor Energy Inc., Alberta (CA)

( * ) Notice: Subject to any disclaimer, the term of this patent is extended or adjusted under 35 U.S.C. 154(b) by 105 days.

(21) Appl. No.: 11/558,303

(22) Filed: Nov. 9, 2006

(65) Prior Publication Data

US 2007/0119994 A1    May 31, 2007

(30) Foreign Application Priority Data

Nov. 9, 2005    (CA) .................................. 2526336

(51) Int. Cl.
    *B02C 19/00*    (2006.01)
(52) U.S. Cl. .......... 241/62; 241/101.75; 299/7; 299/95
(58) Field of Classification Search .......... 241/101.75, 241/101.76, 62; 299/7, 95
    See application file for complete search history.

(56) References Cited

U.S. PATENT DOCUMENTS

| | | |
|---|---|---|
| 3,358,855 A | 12/1967 | Carlton et al. |
| 3,402,896 A | 9/1968 | Daman |
| 4,103,972 A | 8/1978 | Kochanowsky et al. |
| 4,206,840 A | 6/1980 | Hanson et al. |
| 4,212,353 A | 7/1980 | Hall |
| 4,489,818 A | 12/1984 | Franke et al. |
| 4,505,516 A | 3/1985 | Shelton |
| 4,505,811 A | 3/1985 | Griffiths et al. ............... 209/13 |
| 4,512,956 A | 4/1985 | Robinson et al. |
| 4,519,899 A | 5/1985 | Oertle et al. |
| 4,585,180 A | 4/1986 | Potts .......................... 241/186 |
| 4,733,828 A | 3/1988 | Potts .......................... 241/236 |

(Continued)

FOREIGN PATENT DOCUMENTS

CA    1068633 C    12/1979

(Continued)

OTHER PUBLICATIONS

Office Action dated May 23, 2008 for U.S. Appl. No. 11/558,340.

(Continued)

*Primary Examiner*—Mark Rosenbaum
(74) *Attorney, Agent, or Firm*—Knobbe Martens Olson & Bear LLP

(57) ABSTRACT

A mobile slurry apparatus for creating a slurry from oil sand ore has a frame and a slurry box supported by the frame. Water is mixed with the ore to form a slurry that is retained in the slurry box. The frame base has a first set of spaced apart support points for supporting the frame in a stationary mode, and a second set of spaced apart support points for supporting the frame in a moving mode. The second set of spaced apart support points is closer together than the first set of support points and defines a lifting region disposed beneath a center of gravity of the slurry apparatus in a moving mode when the slurry box is empty. Thus, a single moving device can be positioned beneath the second set of support points for lifting and moving the slurry apparatus.

12 Claims, 6 Drawing Sheets

U.S. PATENT DOCUMENTS

| | | | | |
|---|---|---|---|---|
| 4,763,845 | A | * | 8/1988 | Guggenheimer et al. ............. 241/101.71 |
| 4,781,331 | A | | 11/1988 | Potts ............. 241/236 |
| 4,799,627 | A | | 1/1989 | Potts ............. 241/236 |
| 4,859,317 | A | | 8/1989 | Shelfantook et al. |
| 5,161,744 | A | | 11/1992 | Horst et al. |
| 5,316,664 | A | | 5/1994 | Gregoli et al. ............. 208/390 |
| 5,441,206 | A | * | 8/1995 | Schade et al. ............. 241/81 |
| 5,480,566 | A | | 1/1996 | Strand |
| 5,723,042 | A | | 3/1998 | Strand |
| 5,772,127 | A | | 6/1998 | Maciejewski et al. |
| 5,954,277 | A | | 9/1999 | Cymerman et al. |
| 6,074,549 | A | | 6/2000 | Cochrane et al. |
| 6,283,277 | B1 | | 9/2001 | Smith et al. |
| 6,322,327 | B1 | | 11/2001 | Dawson et al. |
| 6,450,775 | B1 | | 9/2002 | Hutchinson et al. |
| 6,527,960 | B1 | | 3/2003 | Bacon et al. |
| 6,821,060 | B2 | | 11/2004 | McTurnk et al. |
| 7,013,937 | B2 | | 3/2006 | Potts ............. 141/387 |
| 2001/0001434 | A1 | | 5/2001 | Daigh et al. ............. 198/301 |
| 2004/0251731 | A1 | | 12/2004 | Potts ............. 299/18 |
| 2004/0262980 | A1 | | 12/2004 | Watson ............. 299/8 |
| 2005/0134102 | A1 | | 6/2005 | Cymerman et al. ............. 299/7 |
| 2005/0173726 | A1 | | 8/2005 | Potts ............. 257/134 |
| 2005/0183930 | A1 | | 8/2005 | Bernard et al. ............. 198/508 |
| 2006/0091249 | A1 | | 5/2006 | Potts ............. 241/236 |

FOREIGN PATENT DOCUMENTS

| | | | | |
|---|---|---|---|---|
| CA | 1153347 | | 11/1980 | ............. 241/123 |
| CA | 1163257 | | 11/1980 | ............. 241/123 |
| CA | 1103184 | C | 6/1981 | |
| CA | 1193586 | | 12/1982 | |
| CA | 1231692 | | 1/1984 | |
| CA | 1266261 | | 2/1986 | |
| CA | 1256045 | C | 6/1989 | |
| CA | 1267860 | C | 4/1990 | |
| CA | 1269945 | C | 6/1990 | |
| CA | 1277941 | C | 12/1990 | |
| CA | 2060780 | C | 8/1992 | |
| CA | 1309050 | C | 10/1992 | |
| CA | 2000984 | C | 11/1994 | |
| CA | 2092121 | A1 | 12/1994 | |
| CA | 2029795 | C | 11/1996 | |
| CA | 2222667 | A1 | 5/1998 | |
| CA | 2088227 | C | 2/1999 | |
| CA | 2249679 | C | 4/1999 | |
| CA | 2325596 | A1 | 10/1999 | |
| CA | 2195604 | C | 11/1999 | |
| CA | 2294860 | | 12/1999 | |
| CA | 2246841 | C | 3/2000 | |
| CA | 2358805 | A1 | 1/2001 | |
| CA | 2332207 | A1 | 10/2001 | |
| CA | 2315596 | A1 | 2/2002 | |
| CA | 2431648 | A1 | 6/2002 | |
| CA | 2259245 | C | 10/2002 | |
| CA | 2227667 | C | 11/2002 | |
| CA | 2358805 | C | 2/2003 | |
| CA | 2235938 | C | 4/2003 | |
| CA | 2498862 | A1 | 7/2003 | |
| CA | 2440312 | | 9/2003 | |
| CA | 2469326 | | 5/2004 | |
| CA | 2499840 | | 3/2005 | |
| CA | 2499846 | | 3/2005 | |
| CA | 2453697 | A1 | 6/2005 | |
| CA | 2518040 | | 9/2005 | |
| CA | 2520821 | | 9/2005 | |
| CA | 2522514 | | 10/2005 | |
| CA | 2476194 | | 1/2006 | |
| CA | 2548370 | | 6/2006 | |
| CA | 2548371 | | 6/2006 | |
| CA | 2558059 | | 8/2006 | |
| CA | 2217623 | C | 8/2007 | |
| DE | 28 34 987 | | 2/1980 | |
| DE | 39 36 681 | | 5/1990 | |
| EP | 0167178 | | 1/1986 | |
| GB | 0401933-1 | | 1/2005 | |
| GB | 0406802-9 | | 1/2005 | |
| WO | WO 83/00318 | | 2/1983 | |
| WO | WO 83/02071 | | 6/1983 | |
| WO | WO 83/03062 | | 9/1983 | |
| WO | WO 83/03444 | | 10/1983 | |
| WO | WO 98/58739 | | 12/1998 | |
| WO | WO 99/54049 | | 10/1999 | |
| WO | WO 00/10896 | | 3/2000 | |
| WO | WO 00/35585 | | 6/2000 | |
| WO | WO 02/092231 | | 11/2002 | |
| WO | WO 02/092231 | A1 | 11/2002 | |
| WO | WO 03/006165 | | 1/2003 | |
| WO | WO 03/074394 | | 9/2003 | |
| WO | WO 2004/060819 | | 7/2004 | |
| WO | WO 2004/094061 | | 11/2004 | |
| WO | WO 2005/000454 | | 1/2005 | |
| WO | WO 2005/046874 | | 5/2005 | |
| WO | WO 2005/046875 | | 5/2005 | |
| WO | WO 2005/072877 | | 8/2005 | |
| WO | WO 2006/035209 | | 4/2006 | |

OTHER PUBLICATIONS

Restriction Requirement dated Dec. 2, 2008 for U.S. Appl. No. 11/558,340.

Office Action dated Apr. 29, 2009 for U.S. Appl. No. 11/558,340.

Protest to CA 2,358,805 Application.

"Oil Sands, Our Petroleum Future" Conference held at Edmonton Convention Centre, Edmonton, Alberta, Canada, Apr. 4-7, 1993.

Rimmer, D.P.; "Hydrocyclone-based Process for Rejecting solids from Oil Sands at the Mine Site While Retaining Bitumen for Transportation to a Processing Plant", seminar entitled Oil Sands—Our Petroleum Future, Apr. 5, 1993, Alberta, Canada.

Jon Harding, "Cost-Saving Moves into High Gear" article in *Financial Post*, Apr. 4, 2006.

"Review of oil Sands Technology" *Canada's Oil Sands: A Supply and Market Outlook to 2015*, National Energy Board, Chapter 4, pp. 22-24, Oct. 2000.

Excerpts from "Information Package for Mobile Crushing Plants (MCP)" *Krupp* Canada.

Jonah, Ken; "Syncrude's Mine Production Planning", *Mine Planning and Equipment*, Singhal (ed.), pp. 443-456, 1988 Balkema, Rotterdam.

Doucet et al., "Drilling and Blasting in Tarsand", Suncor Oil Sands Group, Nov. 7 and 8, 1985.

De Malherbe, et al. "Synthetic Crude from Oil Sands", VDI-Verlag GmbH, Dusseldorf 1983, vol. 3, No. 8, pp. 20-21.

Coward, Julian, seminar material used as class handout, University of Alberta, Mar. 20, 2000.

\* cited by examiner

METHOD AND APPARATUS FOR CREATING A SLURRY

FIELD OF INVENTION

This invention relates to ore processing. In particular, this invention relates to a method and apparatus for creating a slurry from oil sand.

BACKGROUND OF THE INVENTION

The Northern Alberta Tar Sands are considered to be one of the world's largest remaining repositories of oil. The tar sands are typically composed of about 70 to about 90 percent by weight mineral solids, including sand, silt and clay, about 1 to about 10 percent by weight water, and a bitumen or oil film, that comprises from trace amounts up to as much as 21 percent by weight.

Unlike conventional oil reserves, the bitumen is extremely viscous and difficult to separate from the water and mineral mixture in which it is found. Generally speaking, the process of separating bitumen from the tar sands comprises five broad stages. Initially in the first stage, the oil sand is excavated from its location and passed through a crusher, or "sizer," to break down or comminute the ore into conveyable pieces. The crushed ore is then typically combined with hot process water to aid in liberating the oil. The combined comminuted tar sand and hot water is typically referred to as a "slurry." Other agents, such as chemical aids (for example including caustic, surfactant, pH adjuster, dispersant) may be added to the slurry.

The slurry is passed through a slurry box in which the slurry is allowed to mix and dwell for a period, primarily to ensure a proper suction head and a constant flow of slurry to a slurry pump. The slurry output from the slurry box is pumped through a hydrotransport conduit and preferably transported an appropriate distance to condition the slurry, and is typically passed through an extraction facility for separating the bitumen froth from the slurry. Typically the mineral matter is separated from the slurry using specific gravity separation, such as PSV's (Primary Separation Vessels) and hydrocyclones. After the slurry has been processed to remove the optimal amount of bitumen, the remaining material (commonly referred to as tailings) is typically routed into a tailings deposition site.

It has been recognized that, since the bitumen comprises a relatively small percentage by weight of the ore initially extracted, separation of the mineral content from the ore as soon as possible after excavation would lead to the most efficient and cost effective mining process. Over the years, a variety of processes have been used to process and transport the ore from the excavation site. Initially, oil sand excavation and transport were completely mechanical via trucks or conveyor belts from the mine face to a large facility for crushing and conditioning the tar sand. As described in Canadian Patent No. 2,029,795, it was determined that it was preferable to crush the ore at a slurry preparation facility located at an intermediate site and combine the ore with hot process water to create a slurry in which could be hydraulically transported by a pipe. This "hydro-transport" process served the dual purpose of efficiently transporting the slurry from a site near the mine face to a more permanent facility and allowing time for the slurry to be sufficiently conditioned on route. Provided the hydro-transport was over a large enough distance that the dwell time in the pipe was sufficiently long, the slurry would arrive at the separation facility already conditioned. Thus, the previously required separate conditioning step could be omitted from the process.

While hydro-transport solved some of the difficulties with transporting the ore from the mine site face to the separation facility, it did not address the fact that in open pit mining the mine site face moves as ore is excavated, increasing the distance to the slurry facility. Solutions to date have typically relied on constructing longer conveyor belts to transport the ore, or use additional trucks, to move the ore from the mine face to the slurry facility at the intermediate site.

Prior art slurry facilities are stationed in a fixed location. There thus exists a need to increase the efficiency of excavation and transport processes to reduce operating costs.

It would accordingly be advantageous to provide an apparatus for creating a slurry that is mobile and can be advanced as the distance from the slurry facility to the mine face increases.

BRIEF DESCRIPTION OF THE DRAWINGS

In drawings which illustrate by way of example only a preferred embodiment of the invention.

DETAILED DESCRIPTION OF THE INVENTION

Figure 1:
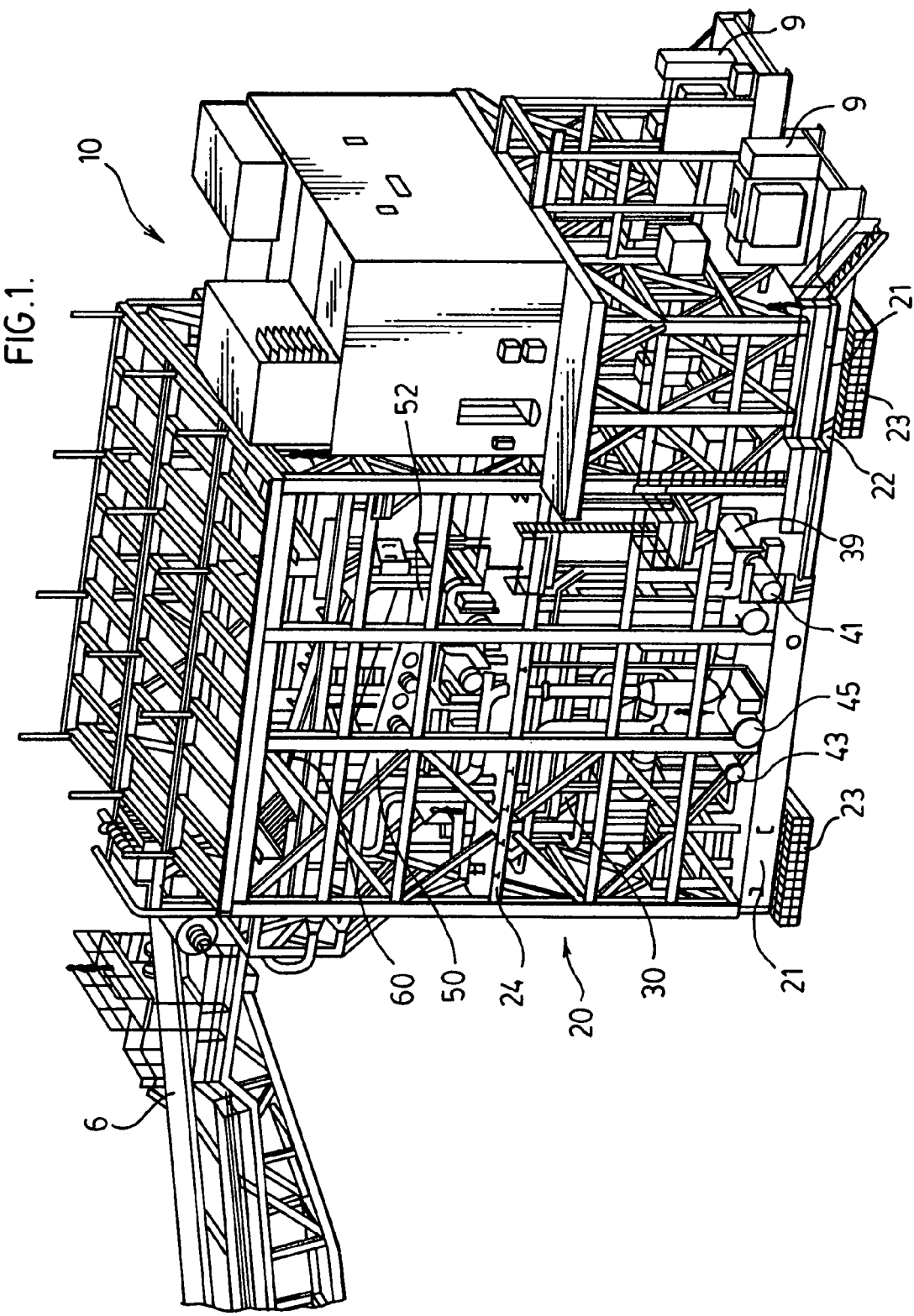
FIG. 1 is a perspective view of a slurry apparatus according to the invention.

In one aspect the invention provides a mobile slurry apparatus for creating a slurry from oil sand ore, comprising a frame, a slurry box supported by the frame, a water supply in communication with the ore or the slurry box, whereby water is mixed with the ore to form a slurry that is retained in the slurry box, the frame comprising a base having a first set of spaced apart support points for supporting the frame in a stationary mode, and a second set of spaced apart support points for supporting the frame in a moving mode, the second set of spaced apart support points being closer together than the first set of support points and defining a lifting region disposed beneath a centre of gravity of the slurry apparatus in a moving mode when the slurry box is empty, whereby a moving device can be positioned beneath the second set of support points for lifting and moving the slurry apparatus.

In a further aspect the invention provides a method of moving from a first site to a second site a slurry facility comprising a comminuting apparatus in communication with a slurry box, whereby comminuted ore is fed to the slurry box, and a frame comprising a base having a first set of spaced apart support points for supporting the frame in a stationary mode and a second set of spaced apart support points for supporting the frame in a moving mode, the second set of spaced apart support points being closer together than the first set of support points, comprising the steps of: a. in any order, i) emptying the slurry box and disconnecting electrical lines and water supplies and a hydrotransport line, and ii) deploying a moving device beneath the base to lift the frame; b. lifting the frame at the second set of support points; c. moving the slurry facility to the second site; d. lowering the slurry facility until it is supported on the first set of support points; and e. reconnecting the electrical lines and water supplies and the hydrotransport line.

A first embodiment of a slurry apparatus or facility 10 according to the invention is illustrated in FIGS. 1 to 4.

The slurry apparatus 10 provides a frame 20 having a base 22. The frame 20 may optionally also be provided with sides 24. The frame 20 is preferably formed from steel girders or I-beams having the required load-bearing capacity, welded, bolted, or otherwise suitably affixed together. The frame supports a slurry box 30, which may be a conventional slurry box constructed to support the desired slurry load. The slurry box 30 essentially acts as a wet surge, maintaining the required constant supply of slurry to the slurry pump 39. The slurry box 30 provides a slurry box outlet 38 which feeds the slurry pump 39, and the slurry pump 39 in turn provides a hydrotransport outlet 41 to which a hydrotransport conduit (not shown) is detachably coupled by suitable means, for example a bolted flange.

An ore size regulating apparatus such as a screen or comminuting apparatus 50 is suspended above the slurry box 30. For example, in the preferred embodiment the comminuting apparatus may be a screening/sizing roller screen such as that described in Canadian Patent Application No. 2,476,194 entitled "SIZING ROLLER SCREEN ORE PROCESSING" published Jan. 30, 2006, which both screens and crushes ore. In the preferred embodiment the comminuting apparatus 50 is supported on the frame 20 of the slurry apparatus 10, with the output face of the comminuting apparatus 50 in communication with the open top of the slurry box 30 such that comminuted ore fed to the comminuting apparatus 50 is directed into the slurry box 30 under the force of gravity. Alternatively, a screen may be provided to screen the incoming ore flow as an initial step before crushing.

Because the slurry apparatus 10 according to the invention is movable, it is advantageous to maintain a low centre of gravity in the slurry apparatus 10 and therefore if the comminuting apparatus 50 is suspended above the slurry box 30 it is advantageous to provide the comminuting apparatus 50 as close as possible (vertically) to the open top of the slurry box 30. The comminuting apparatus 50 may be oriented close to the horizontal, or alternatively may have either a positive or negative angle relative to the horizontal. In a preferred embodiment the comminuting apparatus 50 is oriented at an angle relative to the horizontal such that comminuted ore is fed at the higher end of the comminuting apparatus 50. The comminuting apparatus 50 may be supported on its own separate frame, may be solely supported by a side 24 of the slurry apparatus frame 20, or may be supported on the slurry box 30. Alternatively, the comminuting apparatus 50 may be in communication with the slurry box 30 via one or more interposed conveyor mechanisms, such as a transfer conveyor (not shown).

The comminuting apparatus 50 may alternatively be housed in a separate structure and maintained in communication with the slurry box 30 by a conveying apparatus such as a transfer conveyor (not shown). Similarly, while the illustrated embodiment shows the slurry pump 39 and electrical transformers 9 housed in the structure of the slurry facility 10, it is possible to house these components in one or more separate structures that are detachably connected to the relevant systems in the slurry facility 10 when the slurry facility 10 is in operating mode. It is advantageous to provide transformers 9 within or immediately adjacent to the slurry facility 10, which will gradually be moved away from any permanent transformer substation as mining progresses.

A water supply 60, for example a hood with a spray header (shown in FIG. 5), is positioned to apply hot process water to the ore as it is fed into the comminuting apparatus 50, assisting in the comminuting process and so that ore is already wetted when it enters slurry box 30. As is well known in the art, the hot process water is mixed with the ore in a proportion which provides the desired slurry consistency for conditioning during transport to an extraction facility. The water supply 60 may be provided in any convenient location for dispensing the process water over the ore, preferably before comminution or optionally after comminution.

The slurry box 30 is mounted to the base 22 of the slurry apparatus frame 20 in the desired position. As illustrated in FIG. 2, the frame 20 is supported on a first set of spaced apart support points 21, for example adjacent to the corners where the sides 24 meet the base 22, which may be mounted on crane mats 23 as in the embodiment illustrated in FIGS. 1 and 2, to support the frame 20 in stationary mode, or alternatively may be mounted on pontoons 27 as in the embodiment illustrated in FIGS. 5 and 6. The slurry box 30 may be disposed anywhere within the frame 20, as long as the center of gravity CG1 of the slurry apparatus 10 when the slurry box 30 is filled is within the area bounded by the first set of spaced apart support points 21 (as shown in FIG. 2).

The frame 20 further contains other apparatus incidental to the operation of the slurry facility, which may for example include a gland water supply for the slurry pump 39, cooling units for conditioning the air within the facility 10 to make it suitable for workers, electrical transformers for powering the equipment used in the slurry facility 10, safety equipment, overhead cranes for maintenance and so on. The distribution of equipment about the frame 20 of the slurry apparatus 10 determines a first center of gravity CG1 for the slurry apparatus 10 in a stationary mode, in which the slurry box 30 is filled and operational. Preferably the amount and size of equipment are minimized to keep the weight of the facility 10 as low as possible; for example, the facility 10 may house a single hydrotransport pump 39 (or the hydrotransport pump 39 may be supported on a separate structure as noted above). The heaviest equipment should be as low as possible within the frame 20, to keep the centre of gravity CG1 and CG2 low. In the stationary mode, when the frame 20 is supported on the first set of spaced apart support points 21 and the slurry box 30 is filled with slurry and operational, a considerable additional amount of weight is concentrated in the region of the slurry box 30, which determines the position of the first center of gravity CG1. The frame 20 thus supports all the on-board equipment, plus the weight of the slurry, on the first set of spaced apart support points 21.

Figure 4:
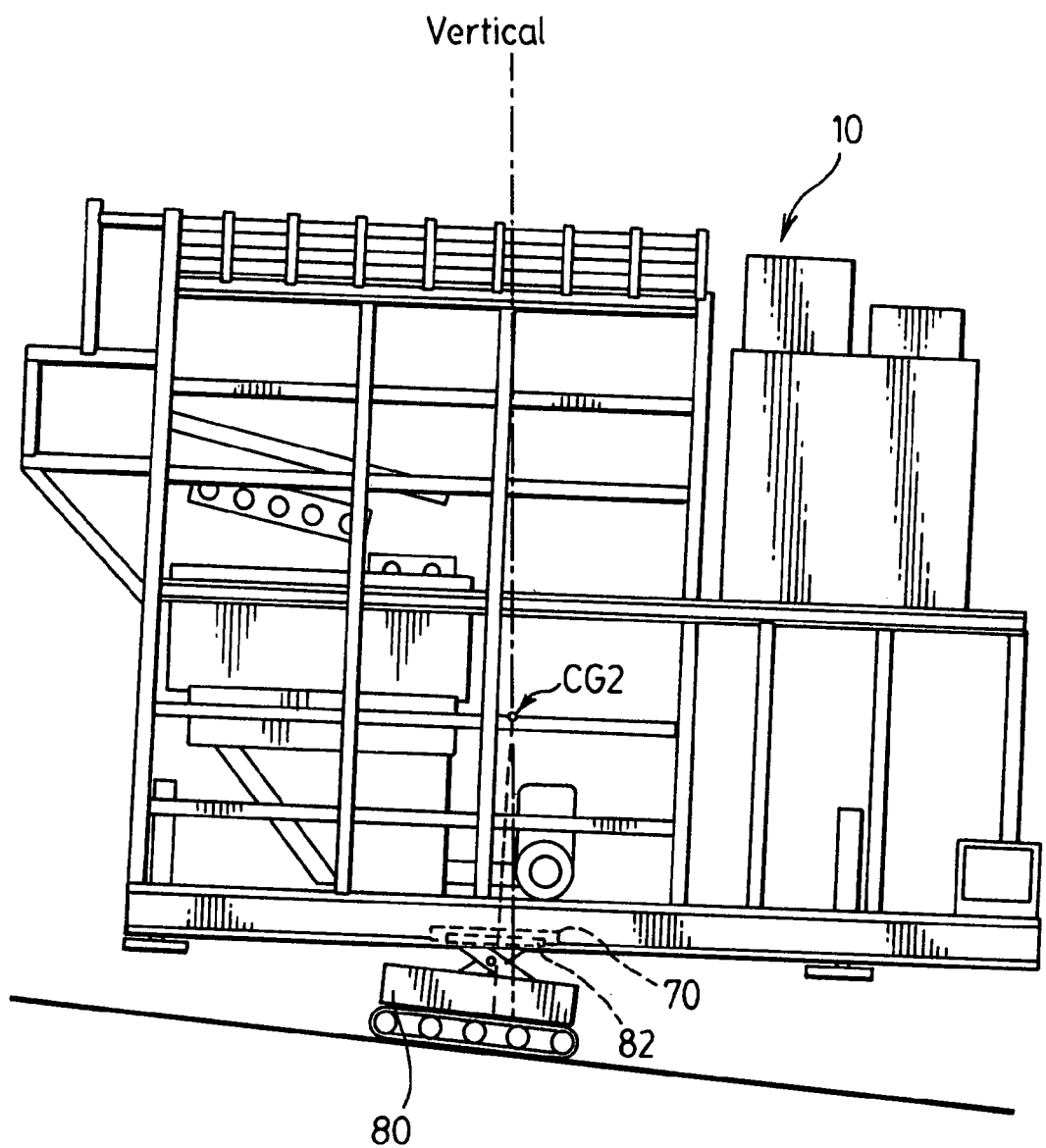
FIG. 4 is a schematic side elevational view showing the apparatus of FIG. 1 being moved on an incline.

In a moving mode, with the slurry box 30 empty, the centre of gravity is disposed at CG2. The base 22 of the frame 20 is provided with a lifting region 70, shown in FIG. 3, which is formed by a series of beams affixed to the main girders 28 of the base 22. The entire slurry apparatus 10 can thus be lifted by a single moving device such as a mobile crawler 80, for example that produced by Lampson International LLC (hereinafter referred to as a "Lampson Crawler"), lifting solely at the lifting region 70, without substantial deformation of the frame 20. The lifting region 70 defines a second set of spaced apart support points 72, which is directly beneath (and preferably centered under) the second center of gravity CG2. The Lampson Crawler, which is essentially a hydraulic lifting platform having a propulsion system and mounted on tracks as illustrated in FIG. 4, can be positioned under the lifting region 70 using locator tabs 74, shown in FIG. 3, and raised to lift the frame 20 while maintaining the stability of the facility 10.

Figure 2:
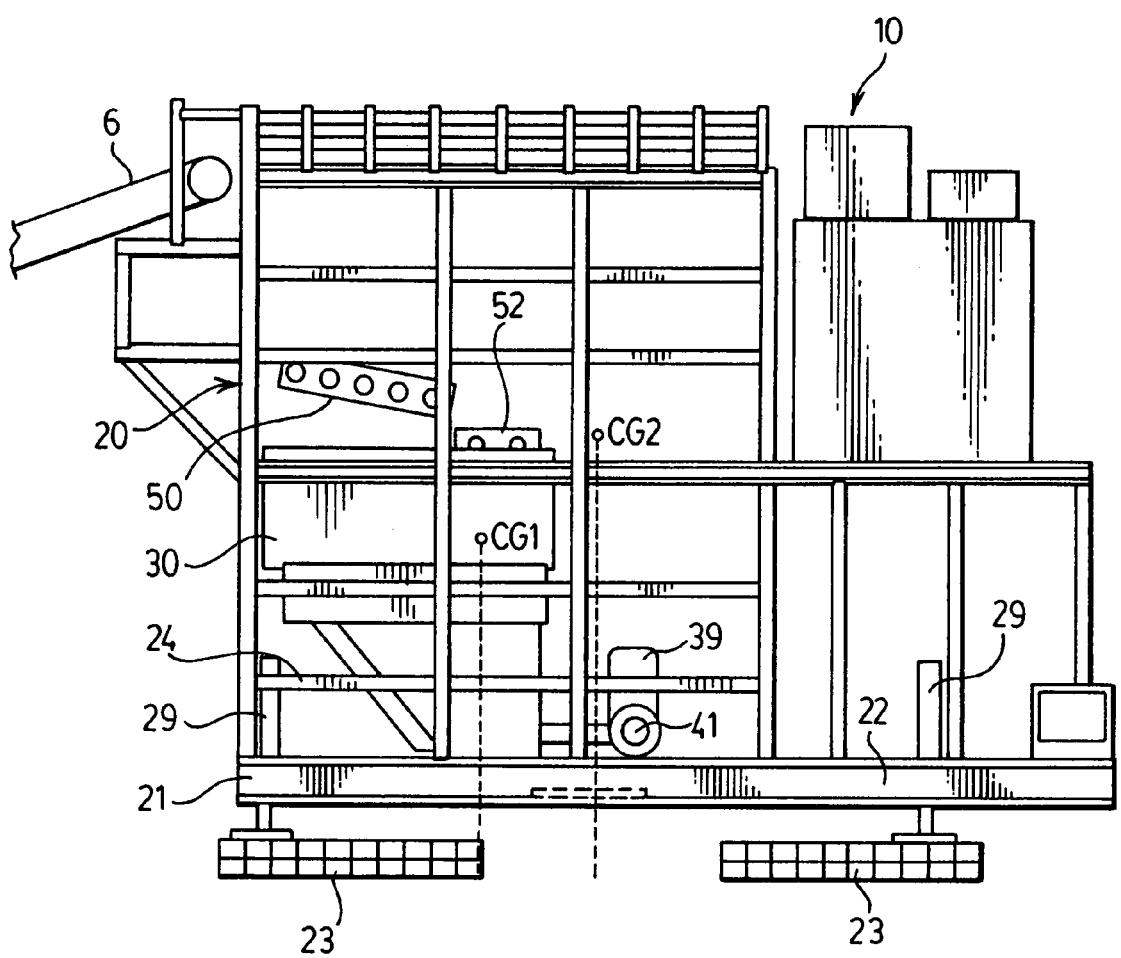
FIG. 2 is a schematic side elevational view of the slurry apparatus of FIG. 1, showing the stationary and operating centres of gravity of the apparatus in a preferred embodiment of the invention.
Figure 3:
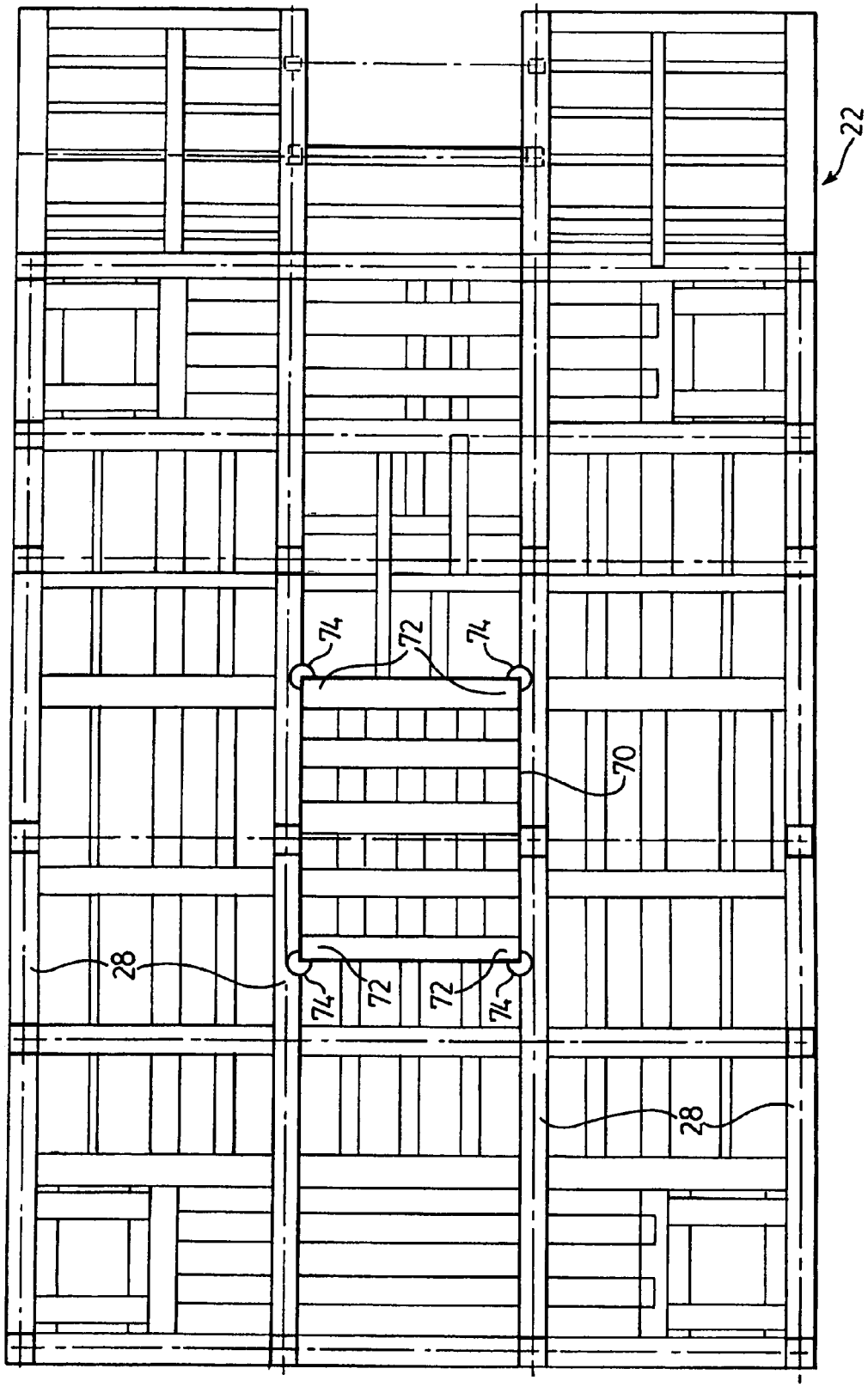
FIG. 3 is a, schematic top plan view of the base of the frame in the slurry apparatus of FIG. 1.

In the operating mode, ore is fed to the comminuting apparatus 50 in any desired fashion, for example via a transfer conveyor 6 as shown in FIGS. 1 and 2. Preferably the transfer conveyor 6 is freestanding and not connected to the slurry apparatus 10, but suspended in communication with the slurry apparatus 10. The ore is processed by the comminuting apparatus 50, preferably to reduce the particle size of the entire inflow of ore to a maximum of 2" to 2½" (although larger ore sizes can also be processed). The comminuting apparatus 50 may include an oversize comminuting component 52 (shown in FIG. 2) to comminute oversized ore and eliminate rejected ore.

The comminuted ore is mixed with water from the water supply 60 and fed into the slurry box 30. A slurry of the consistency desired for hydrotransport is thus created within the slurry box 30. The slurry progresses through the slurry box 30 over the selected retention interval and egresses through the slurry box outlet to a hydrotransport pump 39, which in turn feeds the slurry into a hydrotransport outlet 41 to which a line (not shown) is detachably connected for transport to an extraction facility (not shown). The hydrotransport line is detachable from the hydro transport outlet 41 to allow for periodic movement of the slurry apparatus 10 to a new site as the mine face moves away from the slurry apparatus 10.

The electrical supplies including all power lines (and optionally telecommunications cables) are preferably contained in a power cable that detachably connects to a local connection (not shown) on the slurry facility 10, which may for example be adjacent to the transformers 9, to facilitate easy connection and disconnection of all electrical systems to a standard power source remote to the movable facility 10. Preferably the electrical power system is grounded via cable to a local transformer station or platform, rather than directly into the ground, either via the power cable or via a separate grounding cable, to facilitate detachment and reattachment of the ground connection during the relocation procedure. Similarly, water supplies and connections to fluid outlets (for example emergency pond outlet 45) are not welded but are instead detachably coupled via bolted flanges, quick-connect couplings or other suitable detachable connections as desired to facilitate detachment and reattachment during the relocation procedure.

When it is desired to move the slurry apparatus 10 to a new location, the transfer conveyor 6 is deactivated to discontinue the ore flow, and the slurry box 30 is emptied and flushed. Preferably the slurry apparatus 10 includes a cold water supply 43 for use in flushing the slurry apparatus (and in case of emergency; an emergency outlet 45 is also preferably provided for directing contaminated water to a nearby emergency pond if needed). When the slurry box 30 has been completely emptied and flushed, the hydrotransport line (not shown) is disconnected from hydrotransport outlet 41.

All electrical and water supplies are disconnected from the apparatus 10. Once all water supplies and electrical supplies have been disconnected, the slurry apparatus 10 is ready to be moved to a new location.

A path to the new location is prepared, for example by compacting and laying down a suitable bed of gravel, if necessary. The new location is surveyed to ensure it is level (using gravel if necessary to level the site), and in the embodiment illustrated in FIGS. 1 and 2 crane mats are laid optionally covered by metal sheeting (not shown) to avoid point-loading the crane mats 23. In this embodiment hydraulic jacks 29 are provided generally under the first set of spaced apart support points, supported on the crane mats 23. The jacks 29 are actuated, either in unison or individually in increments, to raise the frame 20 to a height that will allow a moving device 80 such as a Lampson Crawler, with its hydraulic lifting platform 82 in retracted mode, to be driven beneath the base 22 of the frame 20 and positioned under the lifting region 70 using locator tabs 74 (shown in FIG. 3) as a guide to position the hydraulic lifting platform 82. The hydraulic lifting platform 82 is raised, lifting the entire frame 20. When the frame 20 has been raised to support the frame the hydraulic jacks 29 are retracted (as shown in FIG. 4), the propulsion system in the crawler 80 is engaged and the slurry apparatus 10 is moved toward the new location. Preferably the slurry apparatus 10 comprises on-board levels (not shown) at locations visible from the exterior of the apparatus 10, and/or a water level comprising a flexible tube filled with water and extending across the entire frame 20 (not shown), which are carefully monitored by operators to ensure that the facility 10 remains level within the tolerances permitted by the second set of spaced apart support points 72 (as described below).

As illustrated in FIG. 4 the slurry apparatus 10 may be tilted, preferably up to or potentially more than 8° from the vertical, while maintaining the center of gravity in moving mode CG2 over the lifting region 70. This allows the slurry apparatus 10 to be moved up or down a grade, and to tolerate variations of the ground surface. The hydraulic lifting platform 82 on the Lampson Crawler also has the ability to lift differentially, and thus compensate to some extent for the angle of a grade as shown in FIG. 4. However, the slurry apparatus 10 itself may be tilted up to the point where the center of gravity CG2 reaches the periphery of the lifting region 70, beyond which the apparatus 10 will become unstable.

When the new site is reached the hydraulic jacks 29 are extended to support the frame on the crane mats 23 which have been placed on the ground beneath the first set of support points 21, the hydraulic lifting platform 82 is lowered and the Lampson Crawler is driven away from the site. The slurry facility 10 is fully supported by the first set of spaced apart support points 21, and can be returned to the operating mode by extending (from the previous site) and reconnecting the hydrotransport line and all electrical and water supplies. An ore feeder such as a transfer conveyor is positioned in communication with the comminuting apparatus 50, and operation of the slurry facility 10 is resumed. When the slurry box 30 is once again filled with slurry, the center of gravity will shift from CG2 back to CG1, shown in FIG. 2.

Figure 5:
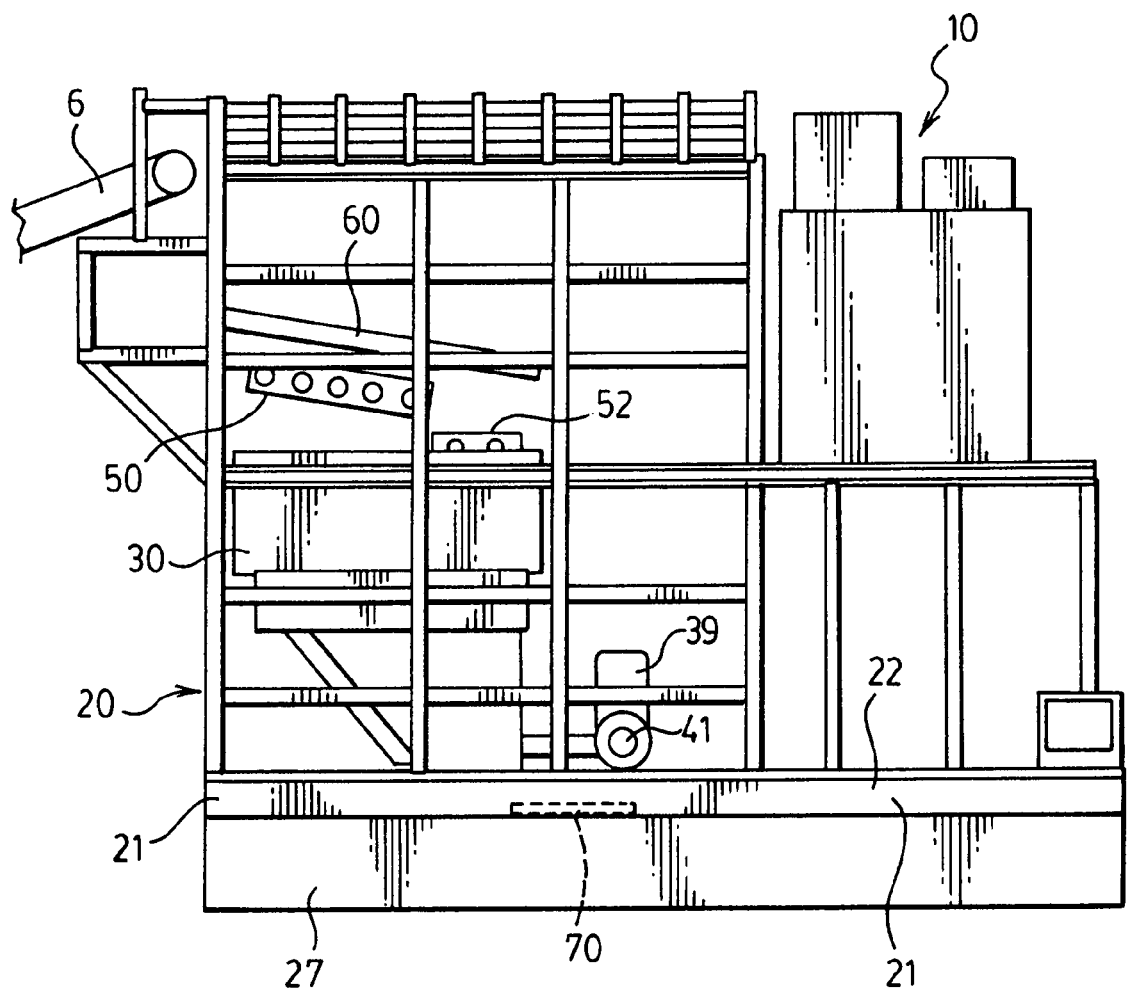
FIG. 5 is a schematic side elevational view of a further embodiment of the slurry apparatus having pontoons.
Figure 6:
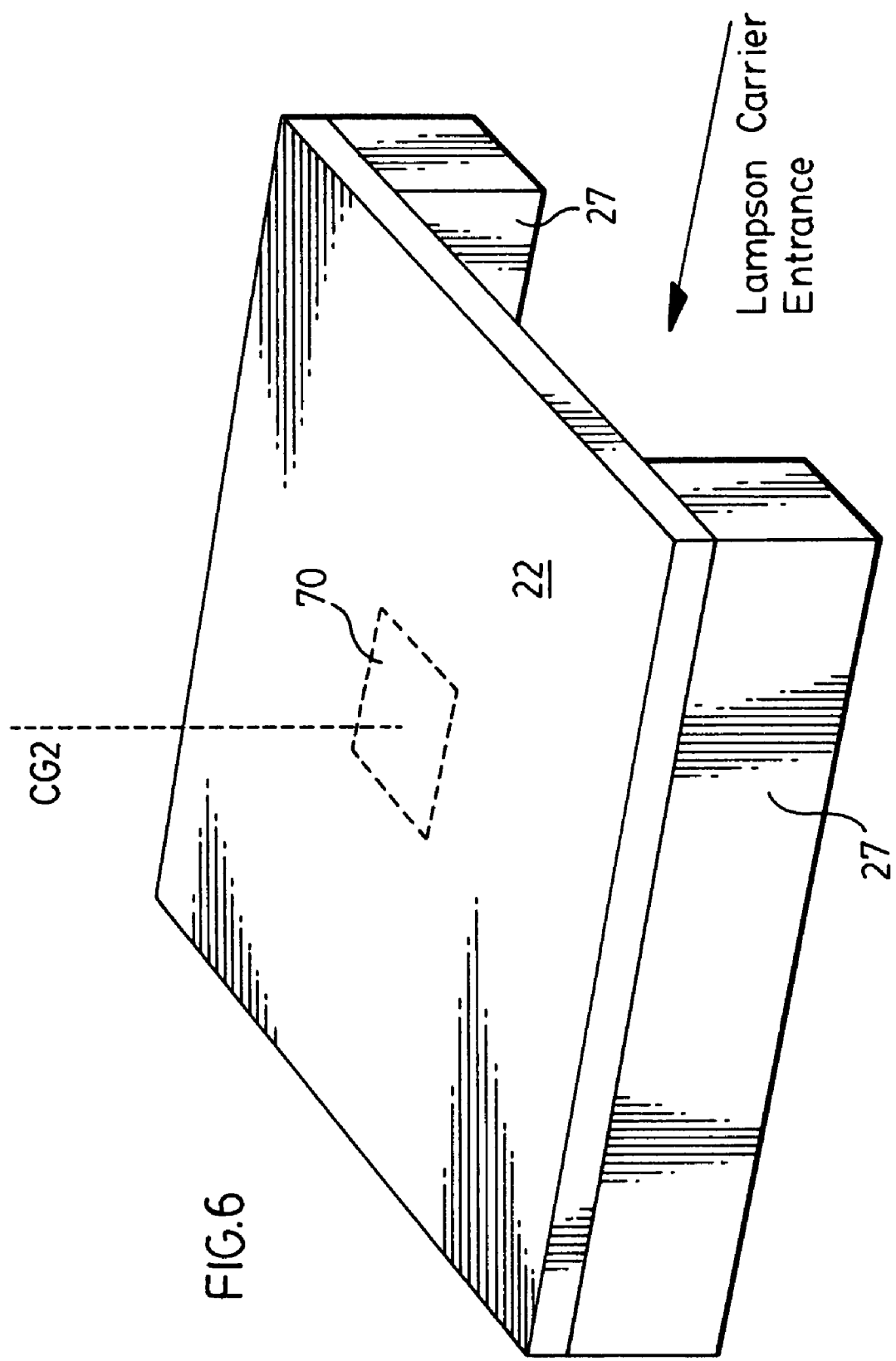
FIG. 6 is a schematic perspective view of the base of the frame in the slurry apparatus of FIG. 5.

In a further embodiment of the apparatus illustrated in FIG. 5, the frame 20 is provided with pontoons 27 onto which the frame 20 is set instead of crane mats 23. This reduces the steps required to both lift the slurry apparatus 10 and to prepare the new relocation site. This also has the advantage of adding weight to the bottom of the frame 20, lowering the centres of gravity CG1 and CG2. The operation of this embodiment is otherwise as previously described.

A preferred embodiment of the invention having been thus described by way of example only, it will be appreciated that variations and permutations may be made without departing from the invention, as set out in the appended claims. All such variations and permutations are intended to be included within the scope of the invention.

What is claimed is:

1. A mobile slurry apparatus for creating a slurry from oil sand ore, comprising:
   a frame having a lower base for supporting the frame;
   a slurry box supported by the frame, wherein the slurry box defines a first center of gravity for the slurry apparatus, the first center of gravity being in a first region located proximate to the slurry box when the slurry box contains a slurry; and means for receiving water for communication with the ore or the slurry box, whereby water is mixed with the ore to form a slurry that is retained in the slurry box when the slurry apparatus is in operation;

the frame comprising a lower base having a first set of spaced apart support points for supporting the frame in a stationary mode, and a second set of spaced apart support points for supporting the frame in a moving mode, the second set of spaced apart support points each being closer together than the first set of support points and defining a single lifting region disposed beneath a second center of gravity of the slurry apparatus in a moving mode when the slurry box is empty, the single lifting region being located proximate to a center of the lower base with a portion of the lifting region located in the center of the lower base;

wherein the single lifting region is defined by the second set of support points so that a single moving device can be positioned beneath the second set of support points for lifting the slurry apparatus under the single lifting region and for moving the slurry apparatus while lifting the slurry apparatus under the single lifting region.

2. The apparatus of claim 1 wherein the second center of gravity of the slurry apparatus in the moving mode is in a different position from the first center of gravity of the slurry apparatus in a stationary mode when the slurry box contains a slurry.

3. The apparatus of claim 1 comprising at least one ore size regulating apparatus in communication with the slurry box.

4. The apparatus of claim 3 wherein the ore size regulating apparatus comprises a comminuting apparatus for directing comminuted ore to the slurry box.

5. The apparatus of claim 4 wherein the water supply wets the ore before or as the ore enters the comminuting apparatus.

6. The apparatus of claim 1 comprising a hydrotransport pump for receiving the slurry from the slurry box and pumping the slurry out of the slurry apparatus.

7. The apparatus of claim 1 comprising a power supply detachably coupled to the slurry apparatus.

8. The apparatus of claim 7 wherein the slurry apparatus is grounded by a detachable cable connecting the slurry apparatus to a remote electrical ground site.

9. The apparatus of claim 1 comprising an emergency pond outlet for discharging fluid to a pond in case of emergency.

10. The apparatus of claim 1, wherein the slurry apparatus is operably configured to, when in the moving mode, be tilted from a notional vertical plane such that the second center of gravity can reach but does not exceed a periphery of the single lifting region while the slurry apparatus continues to be moved by the single moving device.

11. The apparatus of claim 1, wherein the slurry apparatus is operably configured to, when in the moving mode, be tilted from a notional vertical plane up to about 8 degrees while maintaining the second center of gravity in the moving mode over the single lifting region.

12. The apparatus of claim 1, wherein the slurry apparatus is operably configured so that the first center of gravity is situated within a region of the slurry box.

* * * * *

UNITED STATES PATENT AND TRADEMARK OFFICE
CERTIFICATE OF CORRECTION

PATENT NO. : 7,651,042 B2
APPLICATION NO. : 11/558303
DATED : January 26, 2010
INVENTOR(S) : Bjornson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 183 days.

Signed and Sealed this

Twenty-eighth Day of December, 2010

David J. Kappos
*Director of the United States Patent and Trademark Office*